United States Patent
Jeong

(10) Patent No.: US 9,674,813 B2
(45) Date of Patent: Jun. 6, 2017

(54) METHOD AND APPARATUS FOR THE EFFICIENT ESTIMATION OF THE MOVEMENT STATE OF A TERMINAL IN A MOBILE COMMUNICATION SYSTEM

(75) Inventor: Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 14/117,354

(22) PCT Filed: May 10, 2012

(86) PCT No.: PCT/KR2012/003685
§ 371 (c)(1),
(2), (4) Date: Mar. 30, 2015

(87) PCT Pub. No.: WO2012/153997
PCT Pub. Date: Nov. 15, 2012

(65) Prior Publication Data
US 2015/0201395 A1    Jul. 16, 2015

Related U.S. Application Data

(60) Provisional application No. 61/484,645, filed on May 10, 2011.

(30) Foreign Application Priority Data

May 10, 2012   (KR) .................. 10-2012-0049772

(51) Int. Cl.
*H04W 64/00* (2009.01)
*H04W 8/02* (2009.01)
*H04W 36/32* (2009.01)

(52) U.S. Cl.
CPC ........... *H04W 64/006* (2013.01); *H04W 8/02* (2013.01); *H04W 36/32* (2013.01); *H04W 64/00* (2013.01)

(58) Field of Classification Search
CPC ...... H04W 64/006; H04W 36/32; H04W 8/02
See application file for complete search history.

(56) References Cited

U.S. PATENT DOCUMENTS

| 8,731,563 B2 | 5/2014 | Yi |
| 2010/0110897 A1 | 5/2010 | Chun et al. |

(Continued)

FOREIGN PATENT DOCUMENTS

| KR | 10-2006-0099462 | 9/2006 |
| KR | 10-2010-0050336 | 5/2010 |

(Continued)

OTHER PUBLICATIONS

Extended European Search Report dated Mar. 23, 2015 in connection with European Patent Application No. 12781948.0; 9 pages.

(Continued)

*Primary Examiner* — Curtis Odom

(57) ABSTRACT

The present invention relates to a method and apparatus for the efficient estimation of the movement state of a terminal in a mobile communication system. The method for the estimation of the movement state of a terminal in a mobile communication system according to one embodiment of the present invention comprises the following steps: receiving, from a base station, cell counting information to be used in counting for cell change; determining whether or not counting is restricted using the cell counting information during the cell change; if the counting is not restricted, counting the number of cell changes; and estimating the movement state of a terminal using the counted number of cell changes. According to the present invention, the movement state of a terminal can be efficiently estimated in a mobile communication system in which a plurality of cells having different sizes are arranged.

17 Claims, 6 Drawing Sheets

(56) References Cited

U.S. PATENT DOCUMENTS

2011/0021201 A1* 1/2011 Lee ................ H04W 48/20
                                                     455/444
2012/0088509 A1    4/2012 Yi

FOREIGN PATENT DOCUMENTS

KR    10-2011-0011544        2/2011
WO    WO 2007004956 A1       1/2007

OTHER PUBLICATIONS

"Mobility State Detection Enhancement for HetNet"; 3GPP TSG-RAN WG2 #74; R2-11332; LG Electronics; Barcelona, Spain; May 9-14, 2011; 2 pages.
"Discussion on Mobility Estimation for HetNet"; 3GPP TSG-RAN WG2 Mtg. #74; R2-113181; Alcatel-Lucent; Barcelona, Spain; May 9-13, 2011; 3 pages.
"Issues Related to UE Mobility State Estimation in HetNet"; 3GPP TSG-RAN 2 #76 Mtg.; R2-116273; Samsung; San Francisco, USA; Nov. 14-18, 2011; 3 pages.
International Search Report dated Nov. 23, 2012 in connection with International Patent Application No. PCT/KR2012/003685, 3 pages.
Written Opinion of International Searching Authority dated Nov. 23, 2012 in connection with International Patent Application No. PCT/KR2012/003685, 4 pages.
Foreign Communication From a Related Counterpart Application, European Application No. 16197751.7-1875, Extended European Search Report dated Feb. 2, 2017, 7 pages.

* cited by examiner

METHOD AND APPARATUS FOR THE EFFICIENT ESTIMATION OF THE MOVEMENT STATE OF A TERMINAL IN A MOBILE COMMUNICATION SYSTEM

CROSS-REFERENCE TO RELATED APPLICATION(S)

The present application claims priority under 35 U.S.C. §365 to International Patent Application No. PCT/KR2012/003685 filed May 10, 2012, entitled "METHOD AND APPARATUS FOR THE EFFICIENT ESTIMATION OF THE MOVEMENT STATE OF A TERMINAL IN A MOBILE COMMUNICATION SYSTEM". International Patent Application No. PCT/KR2012/003685 claims priority under 35 U.S.C. §365 and/or 35 U.S.C. §119(a) to U.S. Provisional Application No. 61/484,645 filed May 10, 2011 and Korean Patent Application No. 10-2012-0049772 filed May 10, 2012 and which are incorporated herein by reference into the present disclosure as if fully set forth herein.

TECHNICAL FIELD

The present invention relates to a mobility state estimation method and apparatus of a terminal in a mobile communication system.

BACKGROUND ART

Long Term Evolution (LTE)/LTE-Advances (LTE-A) as the 3GPP mobile communication stand provides the high speed packet service based on Orthogonal Frequency Division Multiplexing (OFDM).

FIG. 1 is a diagram illustrating the 3GPP system architecture according to the convention technology. FIG. 1 shows an exemplary structure of the LTE/LTE-A wireless mobile communication system to be referenced in the present invention.

Referring to FIG. 1, the radio access network of the LTE mobile communication system includes evolved Node Bs (eNBs) 105, 110, 115, and 120), Mobility Management Entity (MME) 125, and Serving-Gateway (S-GW) 130. The User Equipment (UE) 135 connects to an external network via the eNB and S-GW. The eNBs 105 to 120 correspond to the legacy node Bs of the UMTS system. The UE 135 connects to the eNB is connected with the UE 135 through a radio channel and responsible for complicated functions as compared to the legacy node B. In LTE, all the user traffic including real time services such as Voice over Internet Protocol (VoIP) are provided through a shared channel and thus there is a need of a device for scheduling data based on the UE state information such as eNBs 105 to 120. Typically, one eNB controls a plurality of cells.

In order to secure the data rate of up to 100 Mbps, the LTE system adopts Orthogonal Frequency Division Multiplexing (OFDM) as a radio access technology in the bandwidth of up to 20 Mhz. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs.

According to the current 3GPP standard TS36.304 UE procedures in idle mode Protocol and TS36.331 Radio Resource Control Protocol, the UE estimates the UE mobility state by comparing a number of cell reselections (applied to the UE in idle mode) or a number of handovers (applied to the UE in connected mode) in a predetermined timer duration.

In the 3GPP standard TS36.304 UE procedures in idle mode Protocol, the mobility state of the UE is classified into one of three states and the eNB signals two sets of timer values and the threshold value to be compared with the number of cell selections or handovers.

In the Heterogeneous Network (HetNet) scenario in which a plurality cells having various sizes are deployed, however, cell reselection or handover may occurs to the cell having various cell sizes with the same or similar geographical area. Furthermore, since the plural cells having various cell sizes may not be installed by the operator, it may be difficult for the eNB to configure the timer values and the threshold value to be compared with the number of cell reselections or handovers for estimating the mobility state of the UE accurately.

DISCLOSURE OF INVENTION

Technical Problem

The present invention has been conceived to solve the above problem and aims to provide a method and apparatus for estimating mobility state of a UE efficiently in a mobile communication system with a plurality cells having different cell sizes.

Solution to Problem

In accordance with an aspect of the present invention, a mobility state estimation method of a terminal in a mobile communication system includes receiving cell counting information for use in counting cell switching from a base station, determining, when the cell switching occurs, whether to count the cell switching based on the cell counting information, counting, when determined to count the cell switching, in the cell switching for a number of cell switching, and estimating the mobility state of the terminal based on the number of counted cell switchings.

In accordance with another aspect of the present invention, a terminal mobility state estimation method of a base station in a mobile communication system includes generating cell counting information for use in counting cell switching of a terminal and transmitting the cell counting information to the terminal.

In accordance with another aspect of the present invention, a terminal of a mobile communication system includes a transceiver which transmits and receives data and a controller which controls receiving cell counting information for use in counting cell switching from a base station, determining, when the cell switching occurs, whether to count the cell switching based on the cell counting information, counting, when determined to count the cell switching, in the cell switching for a number of cell switching, and estimating the mobility state of the terminal based on a number of counted cell switchings.

In accordance with still another aspect of the present invention, a base station of a mobile communication system includes a transceiver which transmits and receives data and a controller which controls generating cell counting information for use in counting cell switching of a terminal and transmitting the cell counting information to the terminal.

Advantageous Effects of Invention

According to the present invention, it is possible to estimate the mobility state of a terminal in a mobile communication system with a plurality of cell having different cell sizes.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
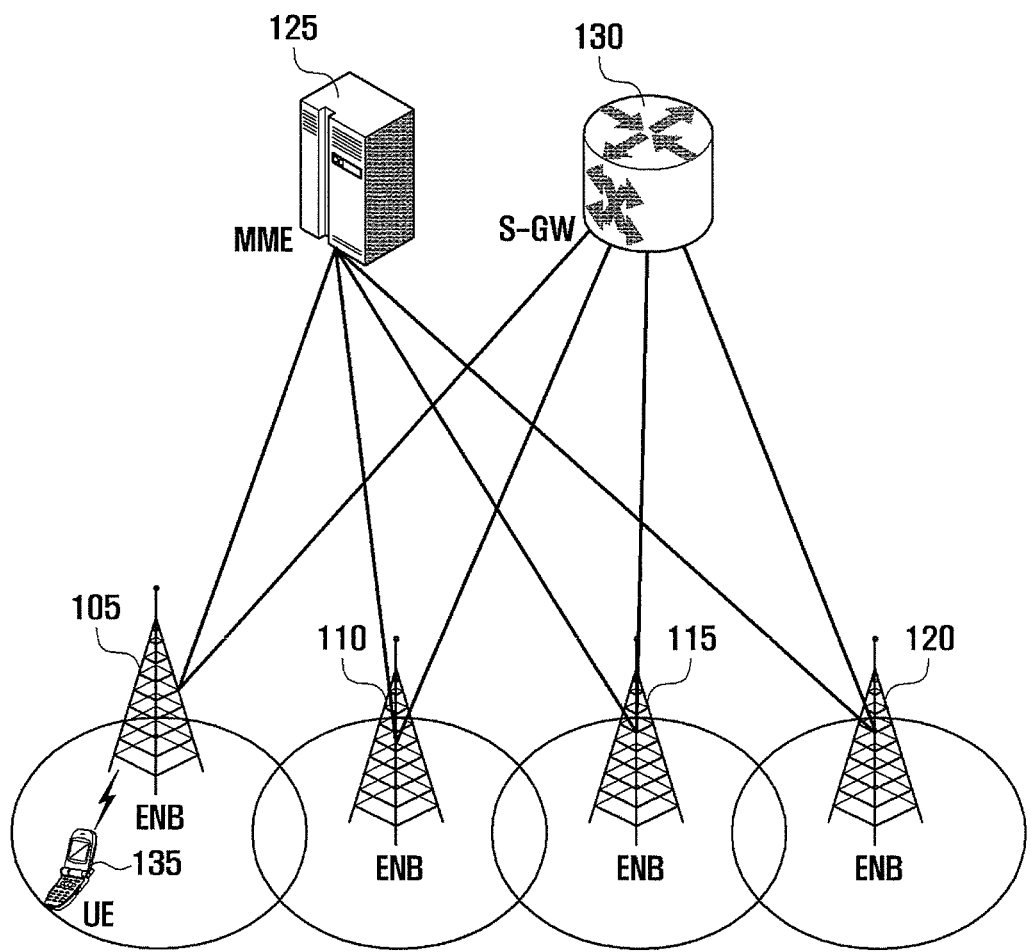
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 corresponds to the legacy node Bs of the UMTS system. The eNB allow the UE 235 to establish a radio link and IS responsible for complicated functions as compared to the legacy node B. In the LTE system, all the user traffic including real time services such as Voice over Internet Protocol (VoIP) are provided through a shared channel and thus there is a need of a device to schedule data based on the state information such as UE buffer conditions, power headroom state, and channel state, the eNBs 105 to 120 being responsible for this. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs.

Figure 2:
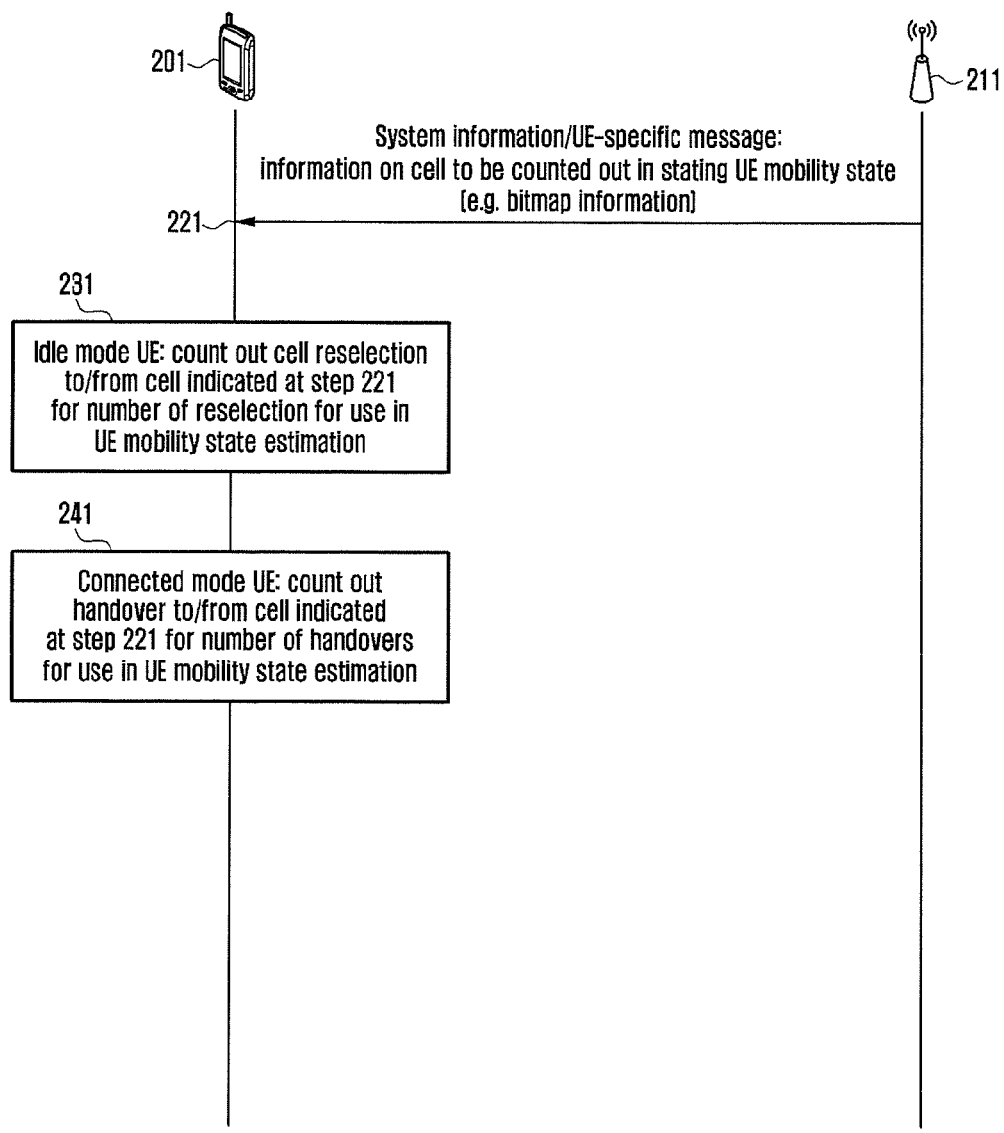
FIG. 2 is a signal flow diagram illustrating a UE mobility state estimation method according to an embodiment of the present invention.

FIG. 2 is a signal flow diagram illustrating a UE mobility state estimation method according to an embodiment of the present invention. FIG. 2 shows the operations between the UE 201 and the eNB 211.

According to FIG. 2, the eNB 211 sends the UE 201 the cell counting information in the system information or UE-specific message at step 221. The cell counting information is the information for use in counting cell reselection for estimating mobility state of the UE. According to an embodiment of the present invention, the cell counting information may include ID information of a specific cell to be counted out or in or an indicator for indicating the cell switching type to be counted out or in. If the cell reselection is performed from or to the specific cell indicated by the cell counting information, the UE may determine that the counting is restricted.

According to an embodiment of the present invention, the cell counting information may include the ID information on a specific cell restricted in counting of cell reselection. In this case, the eNB 211 sends the UE 201 the ID information of the specific cells and, if a cell switching, i.e. cell reselection or handover, to or from the cell indicated by the ID information occurs, the UE 201 counts out such a cell reselection or handover for the number of cell reselections or handovers for estimating UE mobility state while a specific timer is running. In this case, the UE determines that the counting is restricted and thus counts out the cell switching.

Otherwise if a cell switching, i.e. cell reselection or handover, to or from the cell indicated by the ID information occurs, the UE 201 counts in such a cell reselection or handover for the number of cell reselections or handovers for estimating UE mobility state while a specific timer is running. In this case, the UE determines that the counting is not restricted and thus counts in the cell switching.

The cell ID information may be the Physical Cell ID (PCI) information and include a list of cell IDs. The PCI information may be delivered through the System information broadcast by the eNB within the cell or a UE-specific message.

In contrast, the eNB 211 may send the UE 201 the cell counting information including the ID of specific cell to be counted in. In this case, the UE 201 receives the cell counting information and, if a cell switching, i.e. cell reselection or handover, to or from the cell indicated by the ID information occurs, counts in the cell reselection or handover for the number of cell reselections or handovers for estimating UE mobility state while a specific timer is running. If a cell switching, i.e. cell reselection or handover, to or from the cell which is not indicated by the ID information occurs, the UE may count out the cell reselection or handover for the number of cell reselections or handovers for estimating UE mobility state while a specific timer is running.

According to another embodiment of the present invention, the cell counting information may include an indicator indicating a predetermined cell switching type to be counted out or in.

The cell switching type is classified into one of the following 6 types.

cell reselection or handover to frequency band or system different from serving frequency band cell reselection or handover to frequency band or system having priority different from that of serving frequency band cell reselection or handover to or from Home cell or femto cell or Closed Subscriber Group (CSG) cell cell reselection or handover to or from Hybrid Cell cell reselection or handover to or from pico cell cell reselection or handover for receiving Multimedia Broadcast/Multicast Service (MBMS)

If a cell reselection or handover corresponding to at least one of the types occurs, the UE 201 may count out it for the number of cell reselections or handovers for estimating UE mobility state while a specific timer is running according to the indicator of the cell counting information.

The cell switching types are described in more detail hereinafter.

The cell reselection is performed based on priority per frequency, and the priority-based cell reselection method is defined in the 3GPP standard TS36.304 UE procedures in idle mode Protocol. The second type is the case where the UE 201 performs cell reselection or handover to a frequency band or system having a priority different from that of the current serving frequency band and, in this case, it may be counted out for the number of cell reselections or handovers for estimating UE mobility state while a specific timer is running.

The home cell or CSG cell denotes the cell allowing for access of specific UEs and, the definition of CSG cell and cell reselection method therefor are specified in the 3GPP standard TS36.304 UE procedures in idle mode Protocol. The third type is the case where the UE performs cell reselection or handover to or from the home cell or CSG cell and, in this case, it may be counted out for the number of cell reselections or handovers for estimating UE mobility state while a specific timer is running.

The hybrid cell is an intermediate type between the normal cell and home/CSG cell which allows for access of all UEs but allows for access of or serves registered UEs with priority. The fourth type is the case where the UE performs cell reselection or handover to or from the hybrid cell and, in this case, it may be counted out for the number of cell reselections or handovers for estimating UE mobility state while a specific timer is running.

The pico cell denotes the cell having small size and may be installed in a hot spot area. The fifth type is the case where the UE performs cell reselection or handover to or from the pico cell and, in this case, it may be counted out for the number of cell reselections or handovers for estimating UE mobility state while a specific timer is running.

The UE may performs cell reselection or handover to or from a cell operating on a specific (another) frequency band regardless of the UE mobility for receiving UE-interested MBMS service. The sixth type is the case where the UE performs cell reselection or handover to or from a cell operating on a specific (another) frequency band for receiving specific MBMS service and, in this case, it may be counted out for the number of cell reselections or handovers for estimating UE mobility state while a specific timer is running.

Some of the six types may be applied selectively, and plural types may be applied simultaneously. The types to be applied may be fixed according to a predetermined rule or transmitted from the eNB 211 to the UE through the system information or UE-specific message including the cell counting information having the indicator indicating the cell switching types to be counted out. In this case, other cell switching types may be applicable in addition to the six types.

In contrast, the eNB 211 may generate the cell counting information including the indicator indicating the cell switching types to be counted in and sends this information to the UE 201 through the system information or cell-specific message. In this case, the cell switching of the corresponding type is counted in for the number of cell reselections or handovers for estimating UE mobility state while a specific timer is running, and the indicators indicating other types than the aforementioned types may be included.

In the case that the eNB 211 the cell counting information including the indicator indicating predetermined cell switching types to be counted out or in to the UE 201, such information may be expressed as bitmap information. In detail, considering only the aforementioned 6 types, 6-bit bitmap information may be used such that a bit at a certain bit position is set to 1 for indicating the application of a certain condition mapped to the corresponding bit position.

For example, if the 6-bit bitmap information is included and if a bit at a certain bit position is set to 1, the cell reselection or handover type mapped to the bit position is counted out for the number of cell reselections or handovers for estimating UE mobility state while a specific timer is running.

If the 6-bit bitmap information is set to "001011", the cell reselections or handovers corresponding to the third type (cell reselection or handover to or from the home/CSG cell), the fifth type (cell reselection or handover to or from pico cell), and the sixth type (cell reselection or handover for receiving MBMS) mapped to the corresponding bit positions set to "1" among the six cell reselection or handover types are count out for the number of cell reselections or handovers for estimating UE mobility state while a specific timer is running.

Returning to FIG. 2, the UE 201 operates in the idle mode at step 231 and the cell switching in the idle mode includes cell reselection. If a cell reselection occurs at step 231, the UE 201 determines whether to count in or out the cell reselection based on the cell counting information received at step 221 and, if the counting is not restricted, counts in the cell reselection and estimates the mobility state of the UE 201 based on the number of counted cell reselections.

The UE 201 is in the connected mode at step 241, and the cell switching in the connected mode includes handover. If a handover occurs at step 241, the UE 201 determines whether the counting is restricted based on the cell counting information received at step 221 and, if the counting is not restricted, counts in the handover and estimates the mobility state of the UE 201 based on the number of counted handovers.

Although FIG. 2 is directed to the case where the eNB transmits the cell counting information explicitly in order for the UE to count the number of cell reselections or handovers using based on the received counting information, it is possible to determine to count out the cell reselection or handover corresponding to specific types determined fixedly according to a rule without explicit signaling for the number of cell reselections or handovers for estimating UE mobility state.

Figure 3:
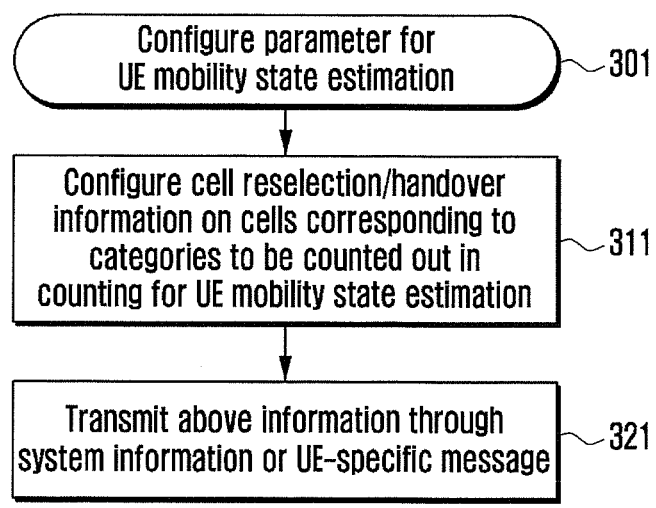
FIG. 3 is a flowchart illustrating the operation procedure of the eNB according to an embodiment of the present invention.

FIG. 3 is a flowchart illustrating the operation procedure of the eNB according to an embodiment of the present invention.

The eNB generates the cell counting information for use in counting cell switching and sends the cell counting information to the UE. Although FIG. 3 is directed to an exemplary case where the eNB generates the cell counting information including an indicator indicating predetermined cell switching types to be counted out or in, it is possible to generate the cell counting information including the ID information of specific cell of which cell switching is counted out or in.

The controller of the eNB first configures the parameters for UE mobility state estimation at step 301. Next, the controller generates the cell counting information including the indicator indicating predetermined cell switching types to be counted out or in at step 311.

As described above, the counting-restricted cell switching types may include at least one of the cell switching to frequency band or system different from serving frequency band, cell switching to frequency band or system having priority different from that of serving frequency band, cell switching to or from Home cell or femto cell or Closed Subscriber Group (CSG) cell, cell switching to or from Hybrid Cell, cell switching to or from pico cell, and cell switching for receiving Multimedia Broadcast/Multicast Service (MBMS)

Next, the controller sends the UE the cell counting information using the system information or UE-specific information at step 321.

Figure 4:
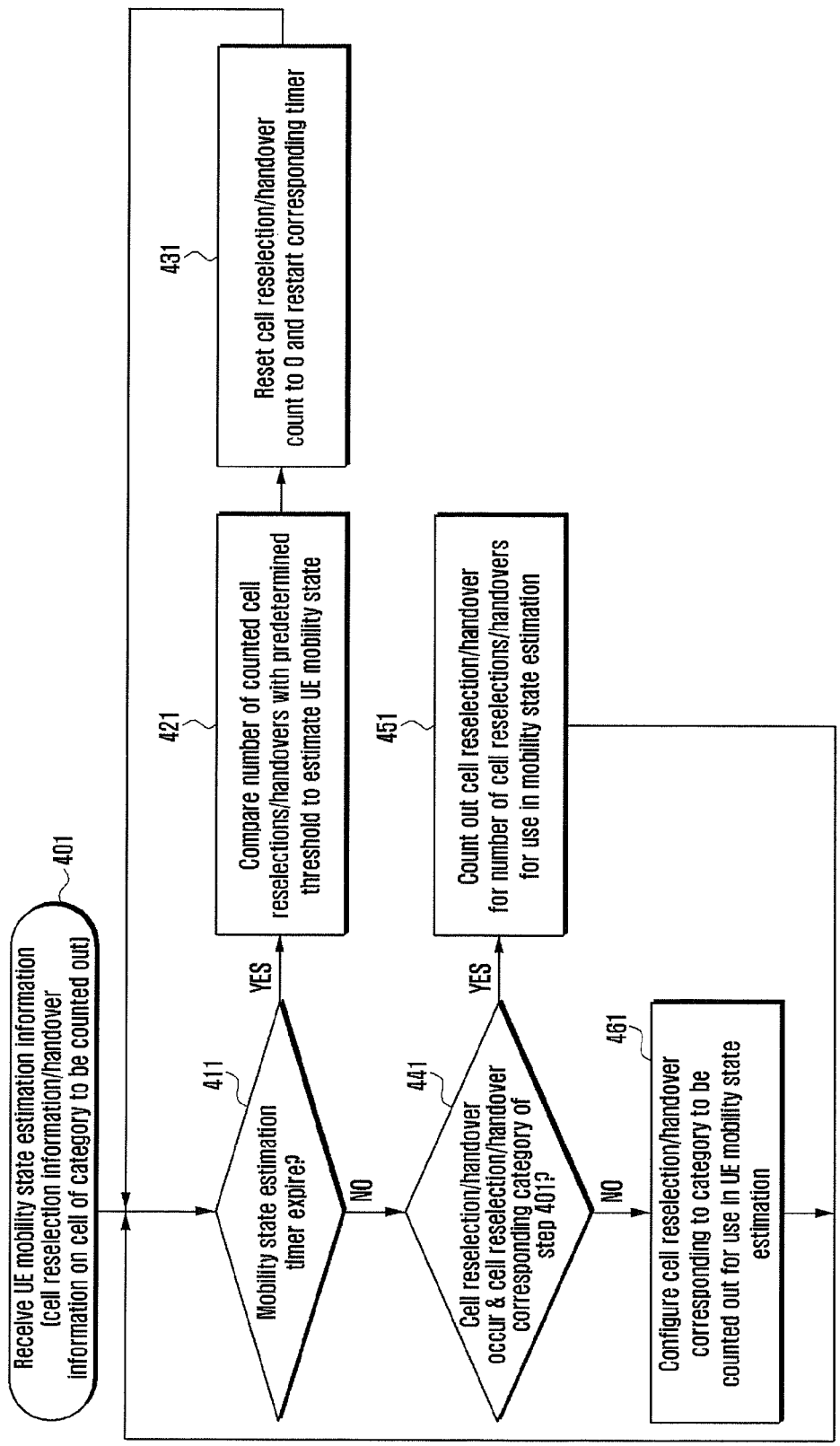
FIG. 4 is a flowchart illustrating the operation procedure of the UE according to an embodiment of the present invention.

FIG. 4 is a flowchart illustrating the operation procedure of the UE according to an embodiment of the present invention. The UE receives the cell counting information for use in counting the cell switching from the eNB, determines, when performing cell switching, whether the cell switching type is counting-restricted, counts, if the cell switching type is not counting-restricted, in the cell switching of the, and estimates the mobility state of the UE based on the number of counted cell switching times. If the cell switching is the cell switching from or to specific cells indicated in the cell counting information, the UE determines that the counting is restricted.

Although FIG. 4 is directed to an exemplary case where the cell counting information includes the indicator indicating predetermined cell switching types to be counted out or in, the cell counting information may include the ID information of specific cells to be counted out or in.

The controller of the UE receives the cell counting information in the system information or UE-specific message by means of the transceiver at step 401. The cell counting information includes an indicator indicating cell reselection or handover types to be counted in or out for the number of cell reselections or handovers for estimating mobility state of the UE.

The cell switching type may be classified into one of the following 6 types.
- cell reselection or handover to frequency band or system different from serving frequency band
- cell reselection or handover to frequency band or system having priority different from that of serving frequency band
- cell reselection or handover to or from Home cell or femto cell or Closed Subscriber Group (CSG) cell
- cell reselection or handover to or from Hybrid Cell
- cell reselection or handover to or from pico cell
- cell reselection or handover for receiving Multimedia Broadcast/Multicast Service (MBMS)

In an exemplary case of using the 6-bit bitmap information, if the 6-bit bitmap information received at step 401 is "001011", the cell reselections or handovers corresponding to the third type (cell reselection or handover to or from the home/CSG cell), the fifth type (cell reselection or handover to or from pico cell), and the sixth type (cell reselection or handover for receiving MBMS) mapped to the corresponding bit positions set to "1" among the six cell reselection or handover types are count out for the number of cell reselections or handovers for estimating UE mobility state while a specific timer is running.

The controller determines whether the timer for estimating mobility state of the UE has expired at step 411. If the timer has not expired, the UE determines, at step 441, where any cell reselection or handover corresponding to the types received at step 401.

If the cell reselection or handover corresponds to the cell reselection or handover type received at step 401, the controller counts out the cell reselection or handover for the number of cell reselections or handovers for UE mobility state estimation at step 451. Otherwise if the cell reselection or handover does not correspond to the cell reselection or handover type received at step 401, the UE counts in the cell reselection or handover for the number of cell reselections or handovers for UE mobility state estimation at step 461.

If the timer has expired at step 411, the controller compares the number of cell reselections or handovers counted before expiry of the timer with a predetermined threshold value to estimate the mobility state of the UE as one of high mobility state, medium mobility state, and normal mobility state.

Afterward, the controller resets the number of cell reselections or handovers and restarts the timer at step 431.

Figure 5:
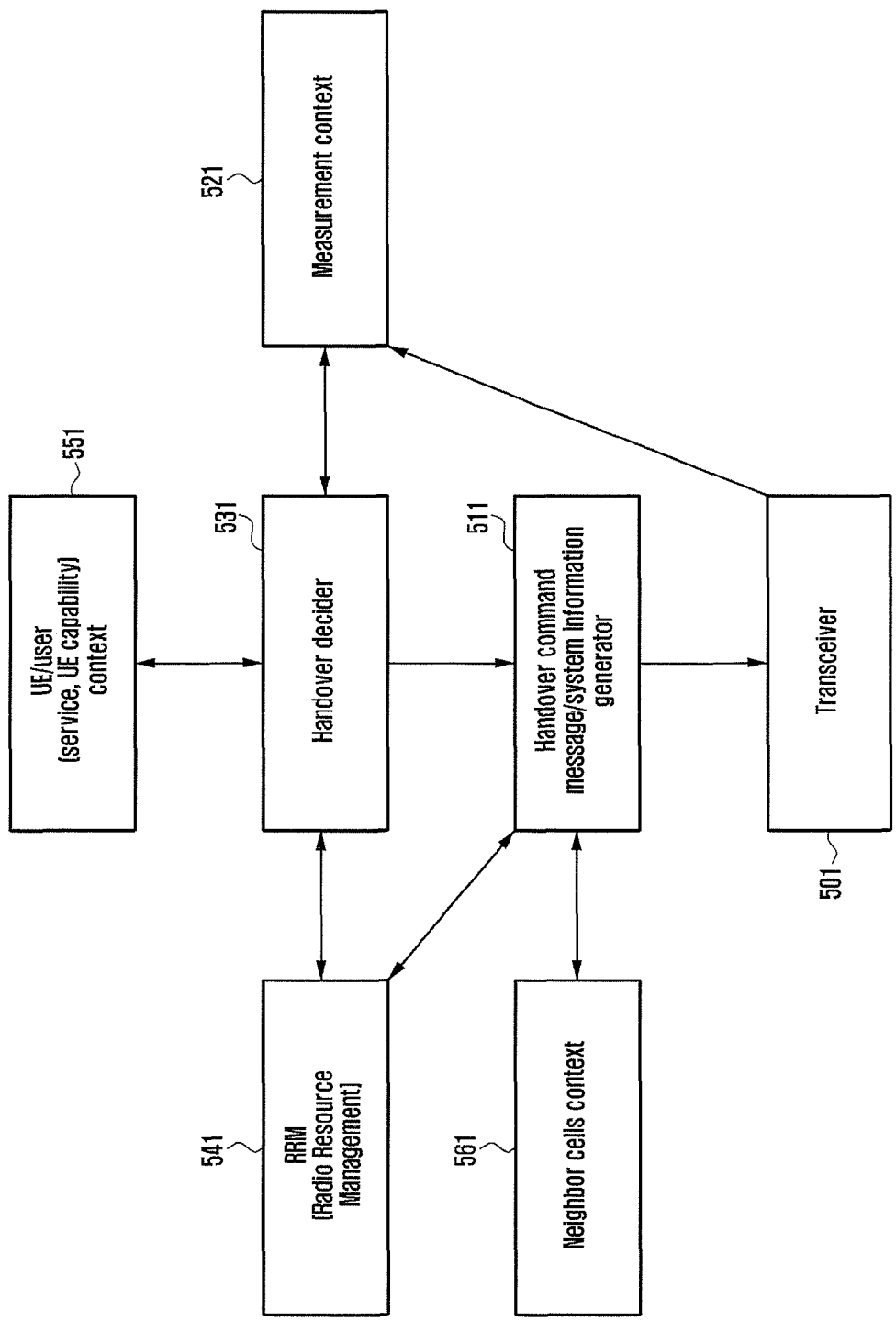
FIG. 5 is a block diagram illustrating a configuration of the eNB according to an embodiment of the present invention.

FIG. 5 is a block diagram illustrating a configuration of the eNB according to an embodiment of the present invention.

The transceiver 501 is responsible for broadcasting system information within the cell and transmitting and receiving UE-specific message and data to and from the UE. The handover command message/system information generator 511 configures handover command or system information with necessary information and generates the message. The handover decider 531 makes a handover decision for the UE based on the UE measurement report information provided by the measurement context 521, radio resource management scheme and policy of the Radio Resource Management (RRM) 541, and user context 551 (e.g. service context of the user and capability context of the UE). The neighbor context 561 denotes the neighbor cell list information of the current cell that is retained in the eNB. The eNB determines the cell reselection or handover types that are counted out for the number of cell reselections or handovers for estimating UE mobility state based on the neighbor context 561 and information input manually by the operator or through O&M server, configures the corresponding information by means of the handover command message/system information generator 511, and transmits the information to the UE by means of the transceiver 501.

Although not shown in FIG. 5, the functions of the handover command message/system information generator 511, the handover decider 531, and RRM 541 may be performed by a controller.

Figure 6:
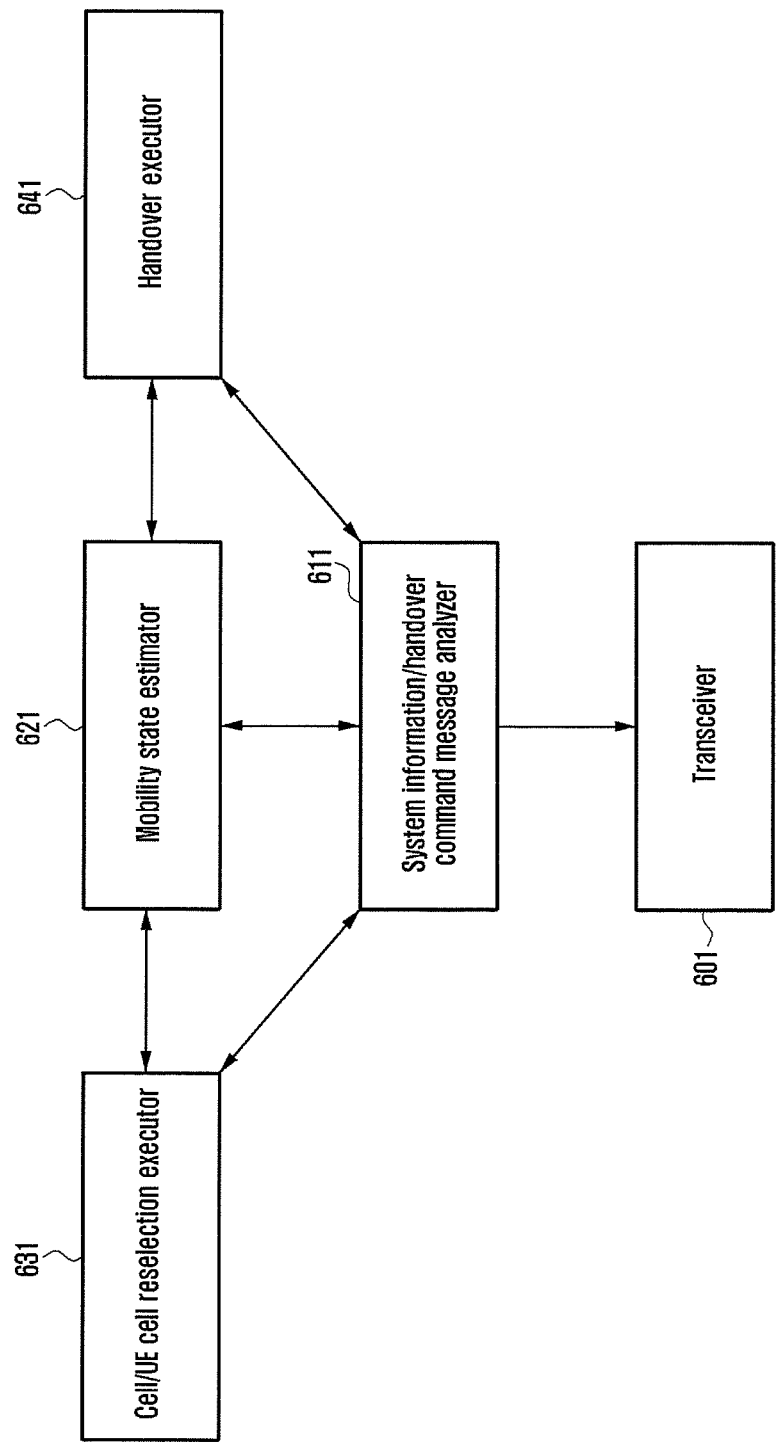
FIG. 6 is a block diagram illustrating a configuration of the UE according to an embodiment of the present invention.

FIG. 6 is a block diagram illustrating a configuration of the UE according to an embodiment of the present invention.

The transceiver 601 is responsible for receiving system information and transmitting and receiving UE-specific message and data to and from the cell or eNB. The system information/handover command message analyzer 611 analyzes the system information and handover command message received by the transceiver 601 and, if cell reselection or handover occurs, the UE may count in or out the cell reselection or handover for the number of cell reselections or handovers for mobility state information based on the UE mobility state estimation information analyzed by the system information/handover command message analyzer 611. The cell reselection executer 631 and the handover executer 641 perform cell reselection or handover according to the movement of the UE.

Although not shown in FIG. 6, the functions of the system information/handover command message analyzer 611, the mobility state estimator 621, the cell reselection executor 631, and the handover executor 641 may be performed by a controller.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a terminal in a wireless communication system, the method comprising:
   receiving cell counting information for use in counting cell switchings from a base station;
   determining, in response to a cell switching occurring, whether to count the cell switching based on the cell counting information;
   counting, when determined to count the cell switchings, in the cell switching for a number of the cell switchings; and
   estimating a mobility state of the terminal based on the number of the counted cell switchings,
   wherein the cell counting information includes information indicating a cell switching type to be counted out, and
   wherein the cell switching type to be counted out comprises at least one of a cell switching to a frequency different from a serving frequency or a frequency having a priority different from the serving frequency, a cell switching related to a hybrid cell, or a cell switching for a multimedia broadcast multicast service (MBMS).

2. The method of claim 1, wherein determining whether to count the cell switchings comprises determining, when the cell switching is a cell switching to or from a cell indicated in the cell counting information, to count out the cell switchings.

3. The method of claim 2, wherein the cell counting information comprises ID information on the cell to or from which the cell switching is counted out or in.

4. The method of claim 1, wherein the cell switching type to be counted out further comprises at least one of a cell switching or handover to or from a Home cell or a femto cell or a CSG cell, or a cell switching to or from a pico cell.

5. A method by a base station in a wireless communication system, the method comprising:
   generating, by the base station, cell counting information for use in counting cell switchings of a terminal; and
   transmitting, by the base station, the cell counting information to the terminal,
   wherein the cell counting information is used by the terminal to determine, in response to a cell switching occurring, whether to count the cell switching,
   the cell switching is counted in for a number of the cell switchings when determined to count the cell switchings, and
   a mobility state of the terminal is estimated based on the number of the counted cell switchings,
   wherein the cell counting information includes information indicating a cell switching type to be counted out, and
   wherein the cell switching type to be counted out comprises at least one of a cell switching to a frequency different from a serving frequency or a frequency having a priority different from the serving frequency, a cell switching related to a hybrid cell, or a cell switching for a multimedia broadcast multicast service (MBMS).

6. The method of claim 5, wherein generating the cell counting information comprises generating the cell counting information with ID information on specific cells to be counted out or in.

7. The method of claim 5, wherein the cell switching type to be counted out further comprises at least one of a cell switching or handover to or from a Home cell or a femto cell or a CSG cell, or a cell switching to or from a pico cell.

8. The method of claim 5, wherein when the cell switching is the cell switching to or from a cell indicated in the cell counting information indicates to the terminal to count out the cell switching.

9. A terminal in a wireless communication system, the terminal comprising:
   a transceiver configured to transmit and receive a signal; and
   a controller configured to:
      receive cell counting information for use in counting cell switchings from a base station,
      determine, in response to a cell switching occurring, whether to count the cell switchings based on the cell counting information,
      count in, when determined to count the cell switchings, the cell switching for a number of the cell switchings, and
      estimate a mobility state of the ten final based on the number of the counted cell switchings,
   wherein the cell counting information includes information indicating a cell switching type to be counted out, and
   wherein the cell switching type to be counted out comprises at least one of a cell switching to a frequency different from a serving frequency or a frequency having a priority different from the serving frequency, a cell switching related to a hybrid cell, or a cell switching for a multimedia broadcast multicast service (MBMS).

10. The terminal of claim 9, wherein the controller is configured to determine, when the cell switching is a cell switching to or from a cell indicated in the cell counting information, to count out the cell switching.

11. The terminal of claim 10, wherein the cell counting information comprises ID information on the cell to or from which cell switching is counted out or in.

12. The terminal of claim 9, wherein the cell switching type to be counted out comprises at least one of a cell switching or handover to or from a Home cell or a femto cell or a CSG cell or a cell switching to or from a pico cell.

13. A base station in a wireless communication system, the base station comprising:
   a transceiver configured to transmit and receive a signal; and
   a controller configured to:
      generate cell counting information for use in counting cell switchings of a terminal, and
      transmit the cell counting information to the terminal,
   wherein the cell counting information includes information indicating a cell switching type to be counted out or in, and
   wherein the cell switching type to be counted out comprises at least one of a cell switching to a frequency different from a serving frequency or a frequency having a priority different from the serving frequency, a cell switching related to a hybrid cell, or a cell switching for a multimedia broadcast multicast service (MBMS).

14. The base station of claim 13, wherein the controller is configured to generate the cell counting information with ID information on specific cells to be counted out or in.

15. The base station of claim 13, wherein the controller is configured to generate the cell counting information with an indicator indicating predetermined cell switching type to be counted out or in.

16. The base station of claim 15, wherein the cell switching type to be counted out further comprises at least one of a cell switching or handover to or from a Home cell or a femto cell or a CSG cell, or a cell switching to or from a pico cell.

17. The base station of claim 13, wherein when the cell switching is a cell switching to or from a cell indicated in the cell counting information indicates to the terminal to count out the cell switching.

* * * * *